(12) United States Patent
Kim et al.

(10) Patent No.: US 10,707,991 B2
(45) Date of Patent: Jul. 7, 2020

(54) METHOD FOR DATA CHANNEL RATE MATCHING ACCORDING TO APERIODIC CSI-RS IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/305,855

(22) PCT Filed: Jun. 26, 2017

(86) PCT No.: PCT/KR2017/006699
§ 371 (c)(1),
(2) Date: Nov. 29, 2018

(87) PCT Pub. No.: WO2017/222352
PCT Pub. Date: Dec. 28, 2017

(65) Prior Publication Data
US 2019/0215096 A1 Jul. 11, 2019

Related U.S. Application Data

(60) Provisional application No. 62/407,460, filed on Oct. 12, 2016, provisional application No. 62/406,375, (Continued)

(51) Int. Cl.
*H04L 1/00* (2006.01)
*H04L 5/00* (2006.01)
(Continued)

(52) U.S. Cl.
CPC .......... *H04L 1/0013* (2013.01); *H04L 1/0025* (2013.01); *H04L 1/0027* (2013.01);
(Continued)

(58) Field of Classification Search
CPC ....... H04B 7/00; H04B 7/0626; H04L 1/0013; H04L 1/0025; H04L 1/0026;
(Continued)

(56) References Cited

U.S. PATENT DOCUMENTS

2013/0322376 A1* 12/2013 Marinier ............ H04B 7/2612
370/329
2016/0127095 A1 5/2016 Chen et al.
(Continued)

FOREIGN PATENT DOCUMENTS

WO    2016039559    3/2016

OTHER PUBLICATIONS

PCT International Application No. PCT/KR2017/006699, Written Opinion of the International Searching Authority dated Oct. 17, 2017, 18 pages.
(Continued)

*Primary Examiner* — Kashif Siddiqui
(74) *Attorney, Agent, or Firm* — Lee Hong Degerman Kang Waimey

(57) ABSTRACT

Disclosed in the present application is a method by which a terminal receives a terminal-specific control channel from a base station in a wireless communication system. Particularly, the method comprises the steps of: receiving, through an upper layer, resource configuration information for at least one aperiodic channel status information-reference signal (CSI-RS); receiving a common control channel including rate matching information of the terminal-specific control channel; and receiving, from the base station, together with the at least one aperiodic CSI-RS, the termi-
(Continued)

nal-specific control channel including a triggering message of a CSI report based on the at least one aperiodic CSI-RS, by using the rate matching information.

8 Claims, 9 Drawing Sheets

Related U.S. Application Data filed on Oct. 10, 2016, provisional application No. 62/405,249, filed on Oct. 7, 2016, provisional application No. 62/378,231, filed on Aug. 23, 2016, provisional application No. 62/376,415, filed on Aug. 18, 2016, provisional application No. 62/373,975, filed on Aug. 11, 2016, provisional application No. 62/354,124, filed on Jun. 24, 2016.

(51) Int. Cl.
  *H04W 28/22* (2009.01)
  *H04W 72/04* (2009.01)
  *H04W 88/02* (2009.01)

(52) U.S. Cl.
  CPC .............. *H04L 5/00* (2013.01); *H04L 5/0048* (2013.01); *H04W 28/22* (2013.01); *H04W 72/0406* (2013.01); *H04W 88/02* (2013.01); *H04L 1/0026* (2013.01)

(58) Field of Classification Search
  CPC ......... H04L 1/0027; H04L 27/34; H04L 5/00; H04L 5/0007; H04L 5/0048; H04L 5/005; H04L 5/0051; H04L 5/0057; H04W 28/22; H04W 72/0406; H04W 88/02
  See application file for complete search history.

(56) References Cited

U.S. PATENT DOCUMENTS

| | | | |
|---|---|---|---|
| 2016/0134408 A1 | 5/2016 | Kim et al. | |
| 2016/0227548 A1* | 8/2016 | Nimbalker | ............ H04L 5/0051 |
| 2018/0324678 A1* | 11/2018 | Chen | ...................... H04W 24/10 |
| 2019/0190673 A1* | 6/2019 | Kwak | ................. H04L 27/2611 |

OTHER PUBLICATIONS

Huawei, et al., "Discussion on efficient utilization of BF CSI-RS", 3GPP TSG RAN WG1 Meeting #85, R1-164858, May 2016, 4 pages.
Samsung, "On aperiodic CSI-RS design", 3GPP TSG RAN WG1 Meeting #85, R1-164773, May 2016, 4 pages.

\* cited by examiner (A) CONTROL-PLANE PROTOCOL STACK (B) USER-PLANE PROTOCOL STACK

METHOD FOR DATA CHANNEL RATE MATCHING ACCORDING TO APERIODIC CSI-RS IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/006699, filed on Jun. 26, 2017, which claims the benefit of U.S. Provisional Application No. 62/354,124, filed on Jun. 24, 2016, 62/373,975, filed on Aug. 11, 2016, 62/376,415, filed on Aug. 18, 2016, 62/378,231, filed on Aug. 23, 2016, 62/405,249, filed on Oct. 7, 2016, 62/406,375, filed on Oct. 10, 2016, and 62/407,460, filed on Oct. 12, 2016, the contents of which are all hereby incorporated by reference herein in their entirety.

TECHNICAL FIELD

The present invention relates to a wireless communication system, and more particularly, to a method for data channel rate matching for transmission of an aperiodic channel status information-reference signal (CSI-RS) in a wireless communication system, and a device therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method for data channel rate matching according to an aperiodic CSI-RS in a wireless communication system, and a device therefor.

Technical Solution

The object of the present invention can be achieved by providing a method for receiving, by a user equipment (UE), a UE-specific control channel from a base station in a wireless communication system, the method including receiving resource configuration information for at least one aperiodic Channel Status Information-Reference Signal (CSI-RS) through a higher layer, receiving a common control channel including rate matching information about the UE-specific control channel, and receiving, from the base station, the UE-specific control channel including a triggering message of CSI reporting based on the at least one aperiodic CSI-RS along with the at least one aperiodic CSI-RS using the rate matching information.

In another aspect of the present invention, provided herein is a user equipment (UE) in a wireless communication system, including a wireless communication module, and a processor connected to the wireless communication module, wherein the processor is configured to receive resource configuration information for at least one aperiodic Channel Status Information-Reference Signal (CSI-RS) through a higher layer, receive a common control channel including rate matching information about a UE-specific control channel, and receive, from a base station, the UE-specific control channel including a triggering message of CSI reporting based on the at least one aperiodic CSI-RS along with the at least one aperiodic CSI-RS using the rate matching information.

In particular, the UE may receive a data channel scheduled by the UE-specific control channel, wherein the UE-specific control channel may include rate matching information about the data channel.

The UE-specific control channel may be received on an assumption that the UE-specific control channel is not mapped to resources for the at least one aperiodic CSI-RS.

In addition, the rate matching information about the UE-specific control channel may include information indicating a subset of resources for the at least one aperiodic CSI-RS, wherein the UE may receive the UE-specific control channel on an assumption that the UE-specific control channel is not mapped to the subset of resources for the at least one aperiodic CSI-RS.

Additionally, the UE may receive resource configuration information for at least one periodic CSI-RS through the higher layer. In this case, the UE may receive the UE-specific control channel on an assumption that the UE-specific control channel is not mapped to a union of resources for the at least one aperiodic CSI-RS and resources for the at least one periodic CSI-RS.

Advantageous Effects

According to embodiments of the present invention, a UE transmitting an aperiodic CSI-RS in a wireless communication system may more efficiently perform rate matching on a data channel.

It will be appreciated by persons skilled in the art that that the effects that can be achieved through the present invention are not limited to what has been particularly described hereinabove and other advantages of the present invention will be more clearly understood from the following detailed description.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
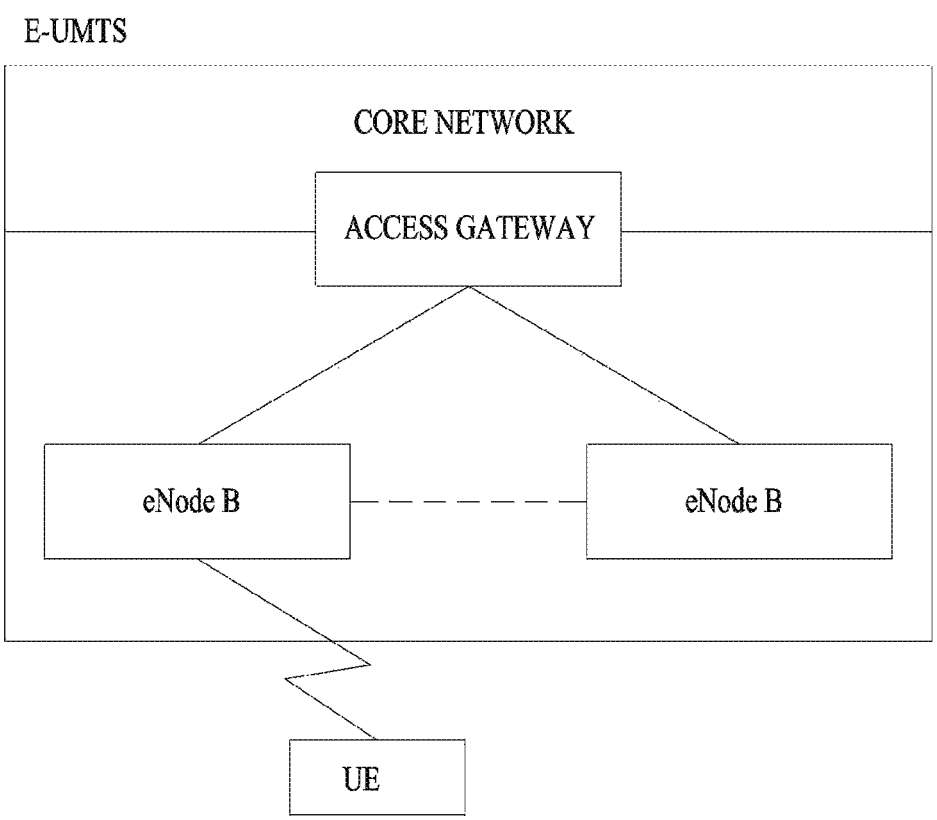
FIG. 1 illustrates a configuration of an Evolved Universal Mobile Telecommunications System (E-UMTS) network as an example of a wireless communication system.
Figure 2:
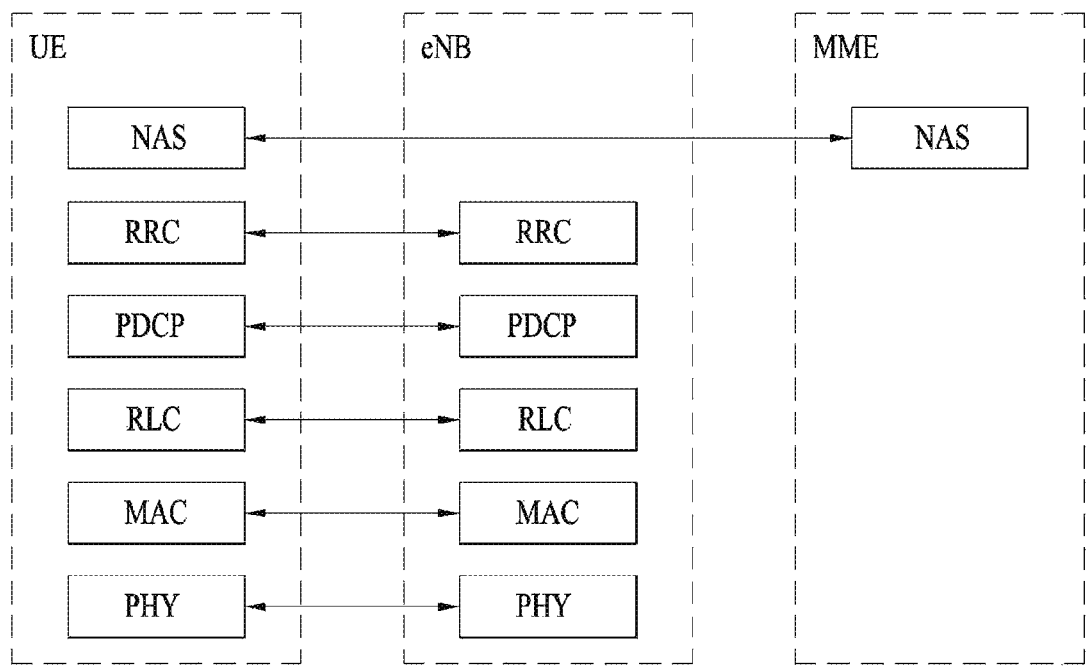
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
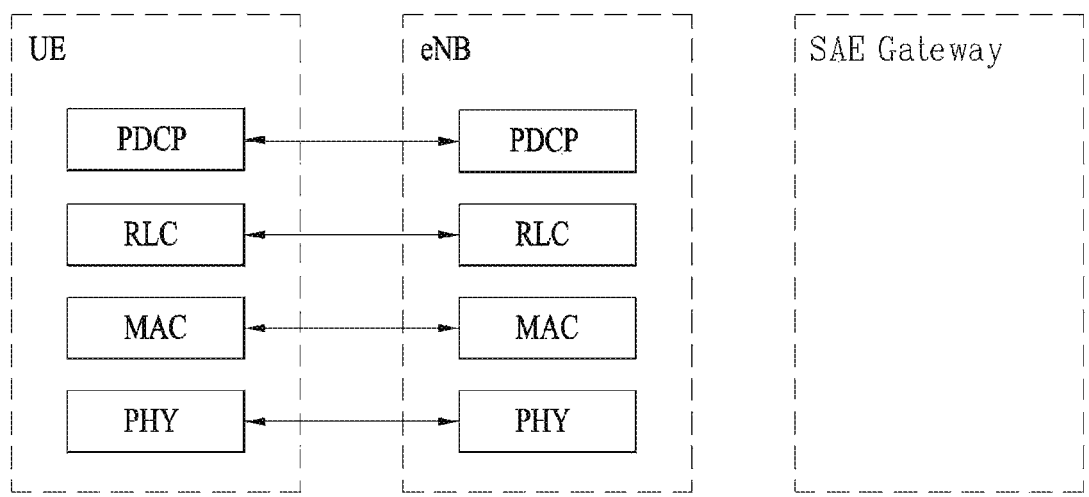

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH)

carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
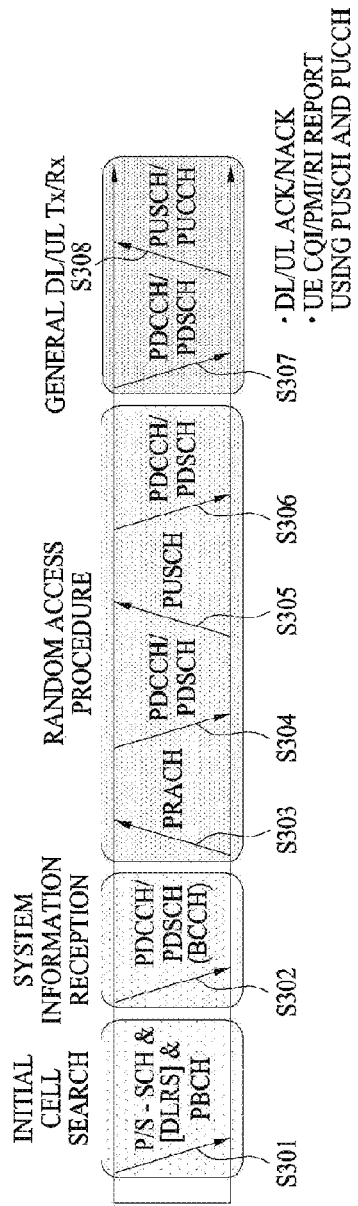
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
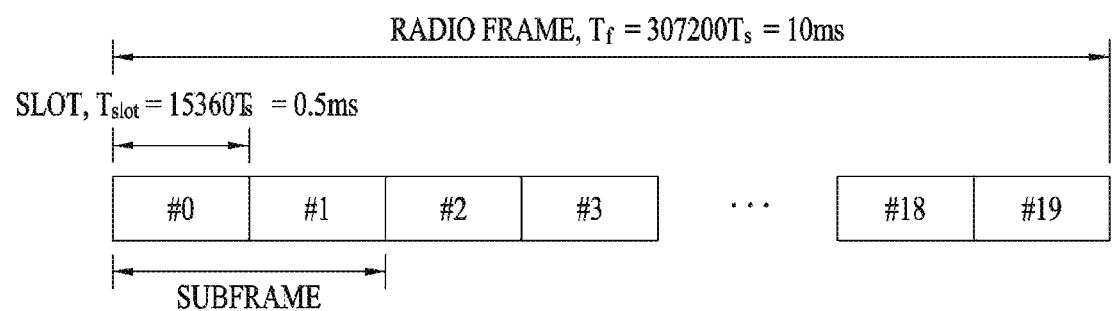
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
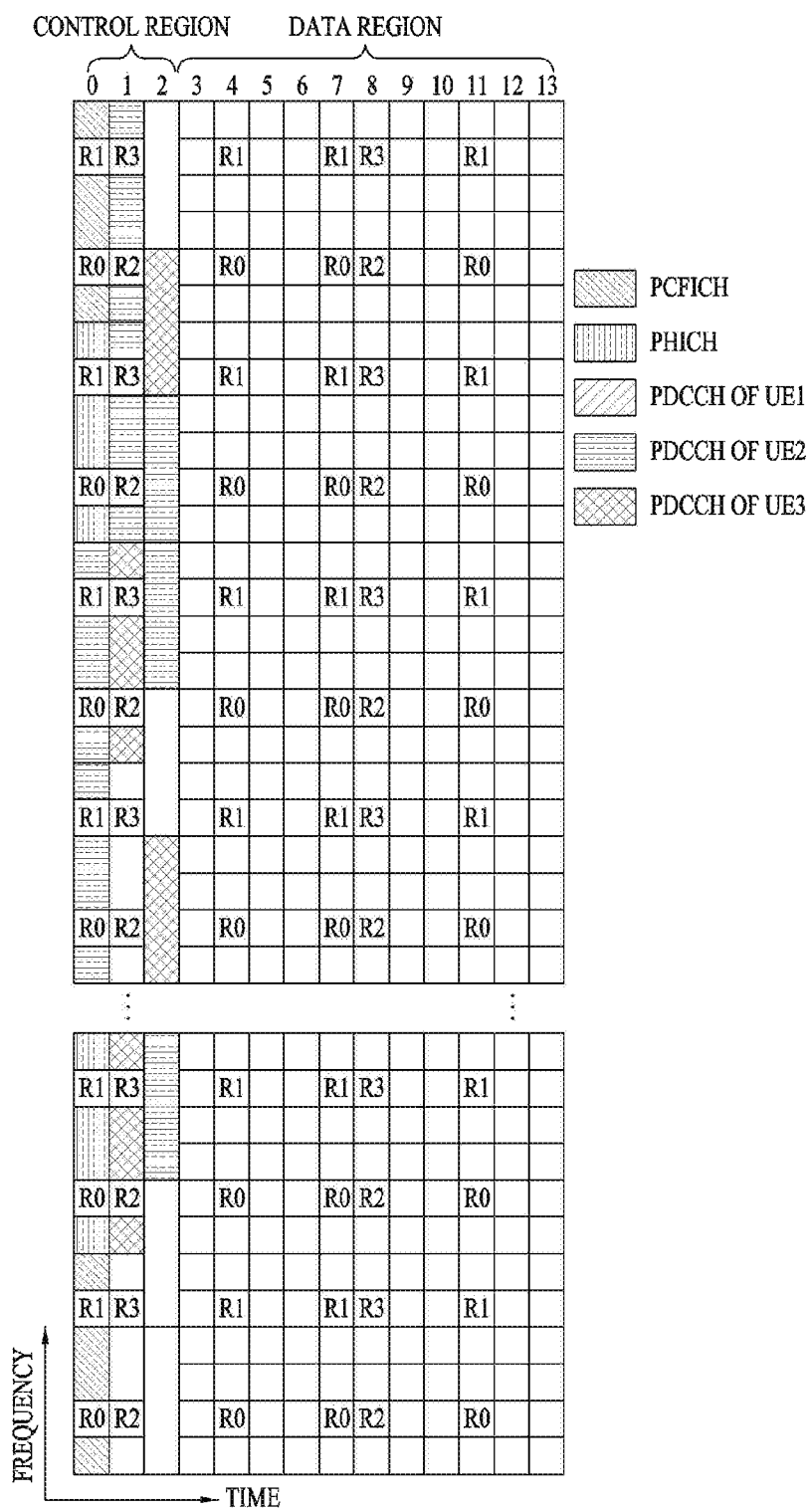
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
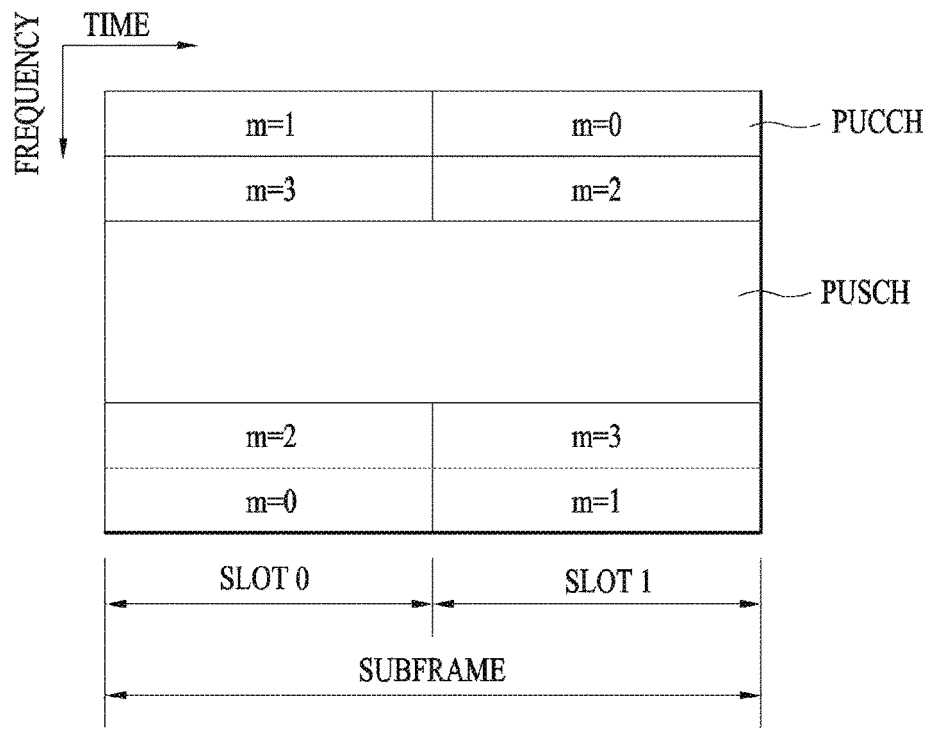
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
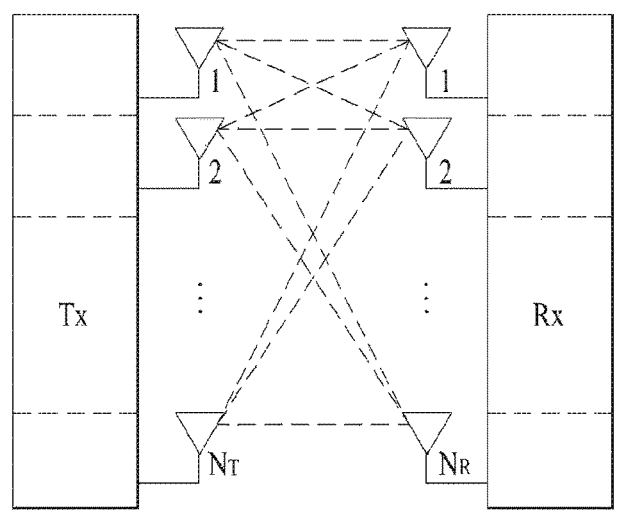
FIG. 7 is a configuration diagram of a general multi-antenna (MIMO) communication system.

The configuration of a general MIMO communication system is shown in FIG. 7. A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$, is represented by the following equation 1 where $R_i$ is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Hereinafter, reference signals will be described in more detail.

Generally, an RS pre-known to both the transmitting side and the receiving side is transmitted from the transmitting side to the receiving side along with data for channel measurement. The RS indicates a modulation technique as well as channel measurement to allow a demodulation procedure to be performed. RSs are divided into a dedicated RS (DRS) for an eNB and a specific UE, i.e., a UE specific RS, and a common RS or cell specific RS (CRS) for all UEs in a cell. The cell specific RS includes an RS used for the UE to measure CQI/PMI/RI and report the CQI/PMI/RI to the eNB, which is referred to as a channel state information-RS (CSI-RS).

The CSI-RS has been proposed for the purpose of channel measurement on the PDSCH, separately from the CRS. Unlike the CRS, the CSI-RS may be defined by up to 32 different resource configurations to reduce inter-cell interference (ICI) in a multi-cell environment.

A CSI-RS (resource) configuration depends on the number of antenna ports. For neighboring cells, CSI-RSs defined by as different (resource) configurations as possible are configured to be transmitted. Unlike the CRS, the CSI-RS supports up to 8 antenna ports. In the 3GPP standards document, a total of 8 antenna ports 15 to 22 are allocated as antenna ports for the CSI-RSs. Tables 1 and 2 below show the CSI-RS configurations defined in the 3GPP standards document. Specifically, Table 1 shows the configurations defined for the normal CP and Table 2 shows the configurations defined for the extended CP.

TABLE 1

| | | | Number of CSI reference signals configured | | | | | |
|---|---|---|---|---|---|---|---|---|
| | CSI reference signal | | 1 or 2 | | 4 | | 8 | |
| | configuration | | (k', l') | $n_s$ mod 2 | (k', l') | $n_s$ mod 2 | (k', l') | $n_s$ mod 2 |
| Frame structure type 1 and 2 | | 0 | (9, 5) | 0 | (9, 5) | 0 | (9, 5) | 0 |
| | | 1 | (11, 2) | 1 | (11, 2) | 1 | (11, 2) | 1 |
| | | 2 | (9, 2) | 1 | (9, 2) | 1 | (9, 2) | 1 |
| | | 3 | (7, 2) | 1 | (7, 2) | 1 | (7, 2) | 1 |
| | | 4 | (9, 5) | 1 | (9, 5) | 1 | (9, 5) | 1 |
| | | 5 | (8, 5) | 0 | (8, 5) | 0 | | |
| | | 6 | (10, 2) | 1 | (10, 2) | 1 | | |
| | | 7 | (8, 2) | 1 | (8, 2) | 1 | | |
| | | 8 | (6, 2) | 1 | (6, 2) | 1 | | |
| | | 9 | (8, 5) | 1 | (8, 5) | 1 | | |
| | | 10 | (3, 5) | 0 | | | | |
| | | 11 | (2, 5) | 0 | | | | |
| | | 12 | (5, 2) | 1 | | | | |
| | | 13 | (4, 2) | 1 | | | | |
| | | 14 | (3, 2) | 1 | | | | |
| | | 15 | (2, 2) | 1 | | | | |
| | | 16 | (1, 2) | 1 | | | | |
| | | 17 | (0, 2) | 1 | | | | |
| | | 18 | (3, 5) | 1 | | | | |
| | | 19 | (2, 5) | 1 | | | | |
| Frame structure type 2 only | | 20 | (11, 1) | 1 | (11, 1) | 1 | (11, 1) | 1 |
| | | 21 | (9, 1) | 1 | (9, 1) | 1 | (9, 1) | 1 |
| | | 22 | (7, 1) | 1 | (7, 1) | 1 | (7, 1) | 1 |
| | | 23 | (10, 1) | 1 | (10, 1) | 1 | | |
| | | 24 | (8, 1) | 1 | (8, 1) | 1 | | |
| | | 25 | (6, 1) | 1 | (6, 1) | 1 | | |
| | | 26 | (5, 1) | 1 | | | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
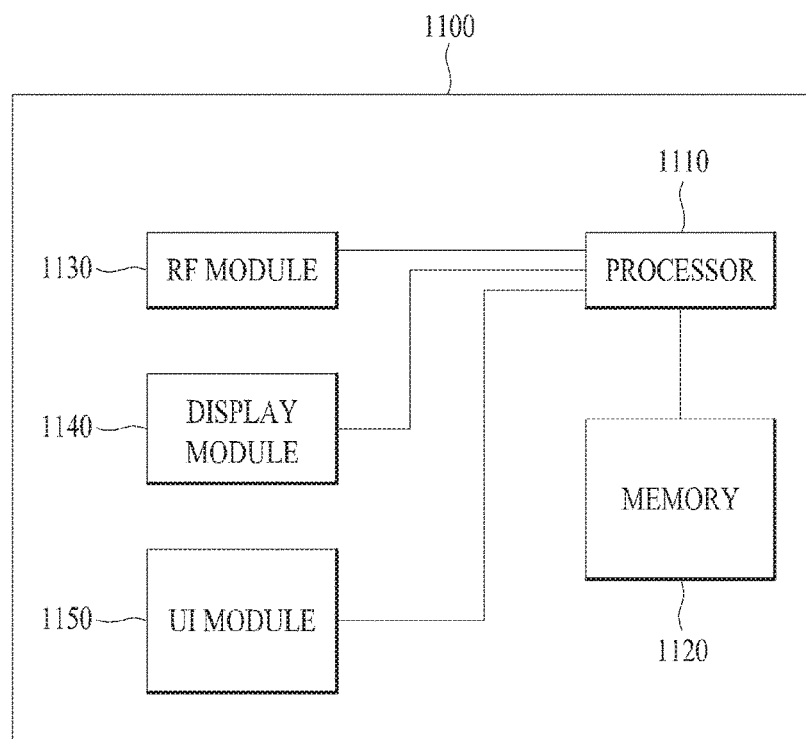
FIG. 11 is a block diagram of a communication apparatus according to an embodiment of the present invention.

In Tables 1 and 2, (k',l') denotes an RE index, k' denotes a subcarrier index, and l' denotes an OFDM symbol index. FIG. 11 illustrates CSI-RS configuration #0 in the case of the normal CP among the CSI-RS configurations defined in the current 3GPP standards document.

A CSI-RS subframe configuration may be defined, which consists of a periodicity $T_{CSI-RS}$ in units of subframes and a subframe offset $\Delta_{CSI-RS}$. Table 3 below shows CSI-RS subframe configurations defined in the 3GPP standards document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Currently, information about the zero-power (ZP) CSI-RS is transmitted over a CSI-RS-Config-r10 message through an RRC layer signal in the form shown in Table 4 below. In particular, the ZP CSI-RS resource configuration consists of zeroTxPowerSubframeConfig-r10 and zeroTxPowerResourceConfigList-r10, which is a 16-bit bitmap. Here, zeroTxPowerSubframeConfig-r10 indicates a periodicity and a subframe offset for transmission of the ZP CSI-RS, using a value of $I_{CSI-RS}$ corresponding to Table 3. In addition, zeroTxPowerResourceConfigList-r10 is information indicating the ZP CSI-RS configuration, and individual elements of the bitmap indicate configurations included in a column having four antenna ports for the CSI-RS in Table 1 or Table 2. That is, according to the 3GPP standards document, the ZP CSI-RS is defined only as a case where there are four antenna ports for the CSI-RS.

TABLE 4

```
-- ASN1START
CSI-RS-Config-r10 ::=  SEQUENCE {
    csi-RS-r10              CHOICE {
        ...
    }
    zeroTxPowerCSI-RS-r10   CHOICE {
        release                           NULL,
        setup                             SEQUENCE {
            zeroTxPowerResourceConfigList-r10  BIT STRING (SIZE (16)),
            zeroTxPowerSubframeConfig-r10      INTEGER (0..154)
        }
    }
}
-- ASN1STOP
```

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI. Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

For reference, according to the current 3GPP standards document, CQI indexes, corresponding modulation orders, and corresponding code rates are shown in Table 5 below.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The operation for calculating CQI through interference measurement is performed as follows.

The UE needs to calculate the SINR as a factor necessary for CQI calculation. In this case, the UE may perform received power measurement (S-measure) of a desired signal using an RS such as the NZP CSI-RS, and measures the power of the interference signal obtained by removing the desired signal from the received signal to perform interference power measurement (I-measure or interference measurement (IM)).

Subframe sets $C_{CSI,0}$ and $C_{CSI,1}$ for CSI measurement may be configured through higher layer signaling, and the subframes corresponding to each subframe set are included in only one of the sets without overlapping each other. In this case, the UE may perform the S-measure through an RS such as the CSI-RS without special subframe constraints. However, in the case of the I-measure, the UE needs to perform the I-measure individually for each of $C_{CSI,0}$ and $C_{CSI,1}$ to perform two different CQI calculations for $C_{CSI,0}$ and $C_{CSI,1}$.

A system of LTE-A, which is the standard of the next-generation mobile communication systems, is expected to support the Coordinated Multi Point (CoMP) transmission scheme, which is not supported in the conventional standards, in order to improve the data rate. Here, the CoMP transmission scheme refers to a transmission scheme in which two or more eNBs or cells cooperate with each other to communicate with a UE to improve performance of communication between the eNBs (cells or sectors) and the UE in a shadow area.

The CoMP transmission scheme may be divided into a scheme of coordinated MIMO joint processing through data sharing (CoMP-Joint Processing (CoMP-JP)) and CoMP-coordinated scheduling/beamforming (CoMP-CS/CB).

In the CoMP-JP scheme on downlink, a UE may instantaneously receive data simultaneously from the respective eNBs that perform the CoMP transmission scheme, and may improve reception performance by combining the signals received from the respective eNBs (Joint Transmission (JT)). Alternatively, one of the eNBs performing the CoMP transmission scheme may transmit data to the UE at a specific point in time (Dynamic Point Selection (DPS)).

Alternatively, in the CoMP-CS/CB, the UE may instantaneously receive data from one eNB, i.e., the serving eNB, through beamforming.

In the CoMP-JP scheme on uplink, the respective eNBs may receive a PUSCH signal from the UE simultaneously (Joint Reception (JR)). In contrast, in the CoMP-CS/CB scheme, only one eNB receives the PUSCH. In this case, coordinated cells (or eNBs) determine to use the CoMP-CS/CB scheme.

In applying the CoMP technique described above, the UE may receive multiple CSI-RS configurations through an RRC layer signal. The respective CSI-RS configurations are defined as shown in Table 6 below. Referring to Table 6, it may be seen that information on CRSs for which a quasi co-location (QCL) assumption may be made is included in each of the CSI-RS configurations.

TABLE 6

CSI-RS-ConfigNZP information elements

```
-- ASN1START
CSI-RS-ConfigNZP-r11 ::=            SEQUENCE {
    csi-RS-ConfigNZPId-r11              CSI-RS-ConfigNZPId-r11,
    antennaPortsCount-r11               ENUMERATED (an1, an2, an4, an8),
    resourceConfig-r11                  INTEGER (0..321),
    subframeConfig-r11                  INTEGER (0..154),
    scramblingIdentity-r11              INTEGER (0..503),
    qcl-CRS-Info-r11                    SEQUENCE {
        qcl-ScramblingIdentity-r11          INTEGER (0..503),
        crs-PortsCount-r11                  ENUMERATED (n1, n2, n4, spare1),
        mbsfn-SubframeConfigList-r11        CHOICE {
            release                             NULL,
            setup                               SEQUENCE {
                subframeConfigList                  MBSFN-SubframeConfigList
            }
        }                                                   OPTIONAL    -- Need ON
    }                                                       OPTIONAL,   -- Need OR
    ...
}
-- ASN1START
```

In the 3GPP LTE-A standard, a PDSCH RE Mapping and Quasi-Co-Location Indicator (PQI) field is defined in DCI format 2D in consideration of transmission mode 10 corresponding to CoMP PDSCH transmission. Specifically, the PQI field is defined in 2 bits and indicates four states in total as shown in Table 7 below. The information indicated by each state is a parameter set for receiving a PDSCH of the CoMP scheme, and the values of the field are specifically signaled through a higher layer. That is, a total of four parameter sets may be semi-statically signaled for Table 7 below through an RRC layer signal, and the PQI field in DCI format 2D dynamically indicates one of the four parameter sets.

TABLE 7

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The information included in the parameter sets includes one or more of the number of CRS antenna ports (crs-PortsCount), a frequency shift value of the CRS (crs-FreqShift), an MBSFN subframe configuration (mbsfn-SubframeConfigList), a ZP CSI-RS configuration (cSI-RS-ConfigZPId), a PDSCH start symbol (pdsch-Start), and Quasi Co-Location (QCL) information about the Non-ZP (NZP) CSI-RS (qcl-CSI-RS-ConfigNZPId).

Hereinafter, Quasi Co-Location (QCL) of antenna ports will be described.

QCL of antenna ports means that it may be assumed that some or all of the large-scale properties of a signal that the UE receives through one antenna port (or a wireless channel corresponding to the antenna port) are the same as the large-scale properties of a signal that the UE receives through another antenna port (or a wireless channel corresponding to the antenna port). Herein, the large-scale properties may include a Doppler spread and a Doppler shift, which are related to a frequency offset, and an average delay and a delay spread, which are related to a timing offset, and may further include an average gain.

According to the definition above, the UE may not assume that antenna ports that are not QCLed, i.e., Non-Quasi co-located (NQCL) antenna ports, have the same large-scale properties. In this case, the UE needs to independently perform a tracking procedure for acquisition of a frequency offset and a timing offset for each antenna port.

For QCLed antenna ports, on the other hand, the UE may perform the following operations.

1) The UE may apply a power-delay profile, a delay spread, a Doppler spectrum and a Doppler spread estimation result of a wireless channel corresponding to a specific antenna port to a Wiener filter parameter and the like used in channel estimation of a wireless channel corresponding to another antenna port.

2) In addition, the UE may acquire time synchronization and frequency synchronization for the specific antenna port, and then apply the same synchronization to other antenna ports.

3) Lastly, regarding an average gain, the UE may calculate a measured value of Reference Signal Received Power (RSRP) for each of the QCLed antenna ports using an average.

For example, when the UE receives DM-RS-based DL data channel scheduling information, for example, DCI format 2C, on the PDCCH (or the E-PDCCH), the UE assumes that data demodulation is performed after channel estimation of the PDSCH is performed through a DM-RS sequence indicated in the scheduling information.

In this case, when a DM-RS antenna port for DL data channel demodulation in the UE is QCLed with a CRS antenna port of the serving cell, the UE may apply the large-scale properties of a wireless channel estimated from the CRS antenna port of the UE in performing channel estimation through the DM-RS antenna port, thereby improving performance of DM-RS-based DL data channel reception.

Similarly, when a DM-RS antenna port for DL data channel demodulation in the UE is QCLed with the CSI-RS antenna port of the serving cell, the UE may apply the large-scale properties of a wireless channel estimated from the CSI-RS antenna port of the serving cell in performing channel estimation through the DM-RS antenna port, thereby improving performance of DM-RS-based DL data channel reception.

In the LTE system, it is defined that the eNB shall configure one of QCL type A and QCL type B for the UE through a higher layer signal in transmitting a DL signal in transmission mode 10, which is the CoMP mode.

Here, QCL type A, which assumes that the large-scale properties of the antenna ports of the CRS, the DM-RS, and the CSI-RS except the average gain are QCLed, means that physical channels and signals are transmitted from the same node (point). On the other hand, QCL type B is defined such that up to four QCL modes are configured per UE through a higher layer message to enable CoMP transmissions such as DPS and JT, and a QCL mode in which a DL signal should be received among the QCL modes is dynamically configured through downlink control information (DCI).

DPS transmission performed when QCL type B is configured will be described in more detail.

First, suppose that node #1 composed of N1 antenna ports transmits CSI-RS resource #1, and node #2 composed of N2 antenna ports transmits CSI-RS resource #2. In this case, CSI-RS resource #1 is included in QCL mode parameter set #1, and CSI-RS resource #2 is included in QCL mode parameter set #2. Further, the eNB configures, through a higher layer signal, parameter set #1 and parameter set #2 for a UE that is present within the common coverage of node #1 and node #2.

Thereafter, the eNB may perform DPS by configuring parameter set #1 for the UE via node #1 using DCI when transmitting data (i.e., PDSCH) to the UE and configuring parameter set #2 when transmitting data via node #2. When the UE receives the configuration of parameter set #1 through the DCI, the UE may assume that CSI-RS resource #1 and a DM-RS are QCLed. When the UE receives the configuration of parameter set #2, the UE may assume that CSI-RS resource #2 and the DM-RS are QCLed.

Recently, research is being actively conducted on an active antenna system (AAS) for next-generation mobile communication. The AAS, which is configured with active antennas each including an active circuit, represents a technique that may be applied more efficiently to reduce interference or perform beamforming by changing an antenna pattern according to the situation.

When the AAS is two-dimensionally constructed, that is, when a 2D-AAS is implemented, the main lobe of the antennas may be more efficiently adjusted three-dimensionally in terms of the antenna pattern. Thereby, the transmission beam may be more aggressively changed according to the position of the reception terminal.

Figure 8:
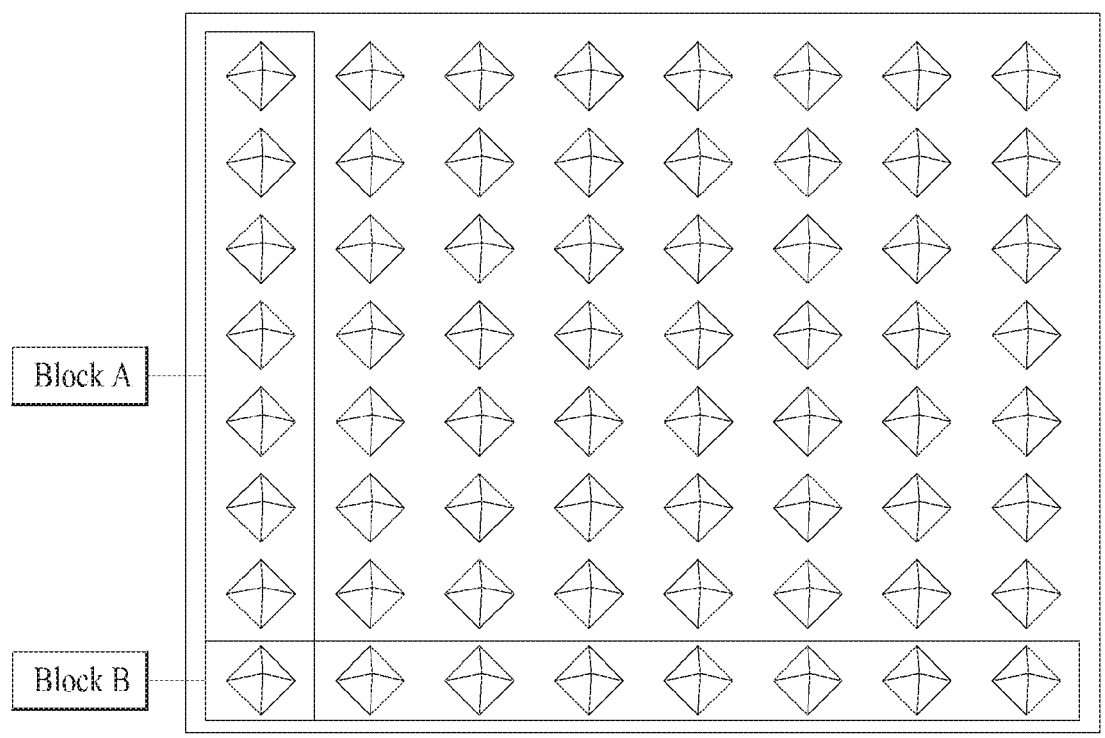
FIG. 8 illustrates an implementation example of a 2D-AAS.

FIG. 8 illustrates an implementation example of a 2D-AAS. In particular, FIG. 8 assumes a co-polarized antenna array including antenna elements having the same polarization. Referring to FIG. 8, the 2D-AAS is expected to be constructed as a multi-antenna system by arranging the antennas in the vertical direction and the horizontal direction.

In a Full Dimension (FD)-MIMO system to which the 2D-AAS is applied, the eNB may configure multiple CSI-RS resources for the UE in one CSI process. Here, the CSI process refers to an operation of feeding back channel information with an independent feedback configuration.

In this case, the UE does not regard the CSI-RS resources configured in one CSI process as an independent channel. Instead, the UE assumes a single large CSI-RS resource by aggregating the resources, calculates CSI from this resource and feeds back the CSI. For example, the eNB configures three 4-port CSI-RS resources for the UE in one CSI process, and the UE aggregates the resources and assumes one 12-port CSI-RS resource. The UE calculates CSI based on the CSI-RS resource using a 12-port PMI and feeds back the CSI. This reporting mode is referred to as Class A CSI reporting in the LTE-A system.

Alternatively, the UE assumes that each CSI-RS resource is an independent channel, selects one of the CSI-RS resources, and calculates and reports CSI based on the selected resource. That is, the UE selects a CSI-RS having a strong channel from among the eight CSI-RSs, calculates CSI based on the selected CSI-RS, and reports the CSI to the eNB. Then, the UE additionally reports the selected CSI-RS to the eNB via a CSI-RS resource indicator (CRI). For example, when the channel of the first CSI-RS corresponding to T(0) is the strongest channel, the UE sets the CRI to CRI=0 and reports the CRI to the eNB. This reporting mode is referred to as Class B CSI reporting in the LTE-A system.

The following parameters may be defined for the CSI process in class B to effectively present the features described above. K denotes the number of CSI-RS resources present in the CSI process. Nk denotes the number of CSI-RS ports for the k-th CSI-RS resource.

In recent 3GPP standardization, an aperiodic Non Zero Power (NZP) CSI-RS (AP NZP CSI-RS) has been introduced in addition to the periodic NZP CSI-RS (P NZP CSI-RS), which is transmitted based on the periodicities and the offsets as shown in Table 3. In particular, the AP CSI-RS differs from the P CSI-RS in that it is transmitted only once at a specific point in time. Hereinafter, the term "NZP" is omitted, and CSI-RS refers to NZP CSI-RS unless the term "zero power (ZP)" is specifically stated.

More specifically, multiple CSI-RS resources may be configured in one CSI process through signaling of the RRC layer, which is a higher layer, wherein the multiple CSI-RS resources may be composed of only P CSI-RSs or AP CSI-RSs, and may be composed of a combination of P CSI-RSs and AP CSI-RSs.

When one AP CSI-RS is configured in one CSI process, the UE operation is clear. When reporting of the AP CSI of the CSI process is triggered through a UL grant, the UE discovers the AP CSI-RS and measures a channel therefor in a subframe (SF) in which the UL grant is received. Then, the UE calculates CSI, and reports the CSI on the PUSCH n subframes (n=4 or 5) after the start time of the triggering. Since subframe configuration information is not present in the configuration of the AP CSI-RS established through RRC signaling, the UE receives the AP CSI-RS in the subframe in which the triggering has occurred.

As the AP CSI-RS is aperiodically transmitted, the UE receiving the DL data needs to perform data rate matching (RM) more dynamically than in conventional cases. When the CSI-RS is periodically transmitted as in the case of the conventional P CSI-RS, the position of the corresponding CSI-RS RE may be indicated to the UE through the ZP CSI-RS, thereby informing that the received data has been rate-matched. However, as an aperiodic CSI-RS is introduced, a new indication method and information provision method for RM are required.

For simplicity, a case where one UE receives an AP CSI-RS while receiving DL data in a specific subframe and a case where one UE receives DL data and another UE receives an AP CSI-RS are separately assumed.

When one UE receives an AP CSI-RS while receiving DL data in a specific subframe, RM for the AP CSI-RS is clear. In the subframe, the UE is aware of the position of the AP CSI-RS RE because the A CSI reporting on the AP CSI-RS has been triggered for UE via the UL grant. Thus, the RM of data may be performed in the AP CSI-RS RE without additional signaling.

On the other hand, when one UE (for example, UE 1) receives DL data and another UE (for example, UE 2) receives an AP CSI-RS in a specific subframe, a new method for RM of UE 1 is needed because A CSI reporting on the AP CSI-RS is not triggered for UE 1.

First, data decoding may be performed on the assumption that UE 1 does not know presence of an AP CSI-RS for UE 2 and data is received in the AP CSI-RS RE. The eNB transmits the data of UE 1 by puncturing the data in the AP CSI-RS RE. As a result, the AP CSI-RS is present at the position of the AP CSI-RS RE in place of the data, and therefore data decoding performance of UE 1 may deteriorate. The performance deterioration becomes severe when the AP CSI-RS RE overhead is large. Thus, an operation of the eNB to instruct UE 1 to perform RM in the AP CSI-RS RE is required.

To this end, the eNB may signal the RM information about the AP CSI-RS through the DCI of UE 1. As described above, in the case of transmission in transmission mode (TM) 10 in the current LTE system, the data RM information may be dynamically indicated through the 2-bit PQI field in the DCI. This is intended to reflect, in the RM, the number of PDCCH OFDM symbols, an CRS RE, and a ZP CSI-RS, which are differently configured according to the data transmission TP, as the TP is dynamically changed when the CoMP DPS is performed. Similarly, the PQI field or an extended form of the PQI field may be used to send the dynamic RM information about the AP CSI-RS.

Thus, it is proposed that the eNB signal dynamic RM information about the AP CSI-RS using one or a combination of RM technique 1 to RM technique 5 described below. In particular, a new field independent of the PQI may be added to the DCI and used for transmission of dynamic RM information about the AP CSI-RS. In this case, the PQI field may be replaced with the new field and the new field may be interpreted in the methods proposed below. Alternatively, the PQI field may be extended (for example, from 2 bits to 3 bits) to define more states to indicate more various kinds of RM information.

<RM Technique 1>

The eNB configures a ZP CSI-RS for RM of the AP CSI-RS for some PQI states, and signals the corresponding PQI state through the DCI. There is no subframe configuration information in the resource configuration of the ZP CSI-RS for RM of the AP CSI-RS. Therefore, when there is no subframe configuration information about the ZP CSI-RS signaled through the PQI, the UE performs RM, assuming that the ZP CSI-RS is configured in the subframe in which the PQI has been signaled.

Alternatively, whether the CSI-RS is an AP ZP CSI-RS or a P ZP CSI-RS may be identified through a separate explicit indication. In this case, RM of the AP ZP CSI-RS is performed on the assumption that the ZP CSI-RS is configured in the subframe in which the PQI has been signaled. For example, AP ZP CSI-RS information may be distinguishably added in addition to an information set (including, for example, a PDSCH start symbol, a ZP CSI-RS, a CSI-RS to be used for QCL type B, CRS RM information, etc.) connected with each state of the PQI. Even in this case, RM of the AP ZP CSI-RS is performed on the assumption that the ZP CSI-RS is configured in the subframe in which the PQI has been signaled. As a result, subframe configuration information is ignored even if it is present in the AP ZP CSI-RS.

<RM Technique 2>

Conventionally, mapping between the PQI states and the ZP CSI-RSs is semi-statically configured through RRC signaling. As a result, one of the four semi-statically configured ZP CSI-RS candidates is dynamically signaled to the UE through the PQI field.

If there are five or more AP CSI-RSs used in a cell, a problem occurs in the case of the conventional technique. For example, when there are 10 UEs in a cell and each UE receives a different AP (beamformed) CSI-RS, there are 10 AP CSI-RSs in total. In this case, when only four ZP CSI-RS candidates are semi-statically mapped to the PQI according to the conventional technique, RM may not be performed for the remaining six AP CSI-RSs. Therefore, there is a need for a method of dynamically changing mapping between the PQI and the ZP CSI-RSs.

To address this issue, the eNB may signal 10 ZP CSI-RSs for the 10 AP CSI-RSs to the UE through RRC signaling and then announce mapping between the 10 ZP CSI-RSs and n PQI states (e.g., n=4) through MAC level signaling (or dynamic signaling).

<RM Technique 3>

As another method to address the issue of RM technique 2, a resource configuration (i.e., RE pattern) bitmap of the ZP CSI-RSs connected with the PQI states may be dynamically defined through MAC level signaling (or dynamic signaling) regarding the PQI states used for RM of the AP CSI-RSs.

For example, when ZP CSI-RSs 0 to 3 are connected with PQI states 0 to 3 for the UE, respectively, the RE pattern of each ZP CSI-RS is redefined through MAC level signaling. Specifically, when there are 10 UEs in a cell and each UE receives a different AP (beamformed) CSI-RS, there may be 10 AP CSI-RSs in total, and therefore 4 AP CSI-RSs out of the 10 AP CSI-RSs may be rate-matched. Then, RM of other 4 AP CSI-RSs may be performed by redefining the RE pattern of the ZP CSI-RS through MAC signaling after several subframes.

As a simpler operation, only one PQI state may be defined to be used for RM of the AP CSI-RSs, and the RE pattern of the ZP CSI-RSs may be dynamically defined for the PQI state through MAC level signaling (or dynamic signaling). Of course, the other states of the PQI may be used for other purposes such as CoMP.

<RM Technique 4>

For RM technique 4, it is proposed that a subset selector (SS) field other than the PQI be added to the DCI and RM of AP CSI-RSs be performed through a combination of the two fields. The SS may be transmitted in the DCI, or may be transmitted through MAC layer signaling to reduce DCI signaling overhead.

For example, a ZP CSI-RS used for RM is selected through the 2-bit PQI field, and a subset of ZP CSI-RS REs thereof is designated through the SS field. The UE performs muting and RM on the assumption that only the subset designated in the SS is an actual ZP CSI-RS. The UE assumes that data is transmitted in the ZP CSI-RS REs of the remaining subset.

Figure 9:
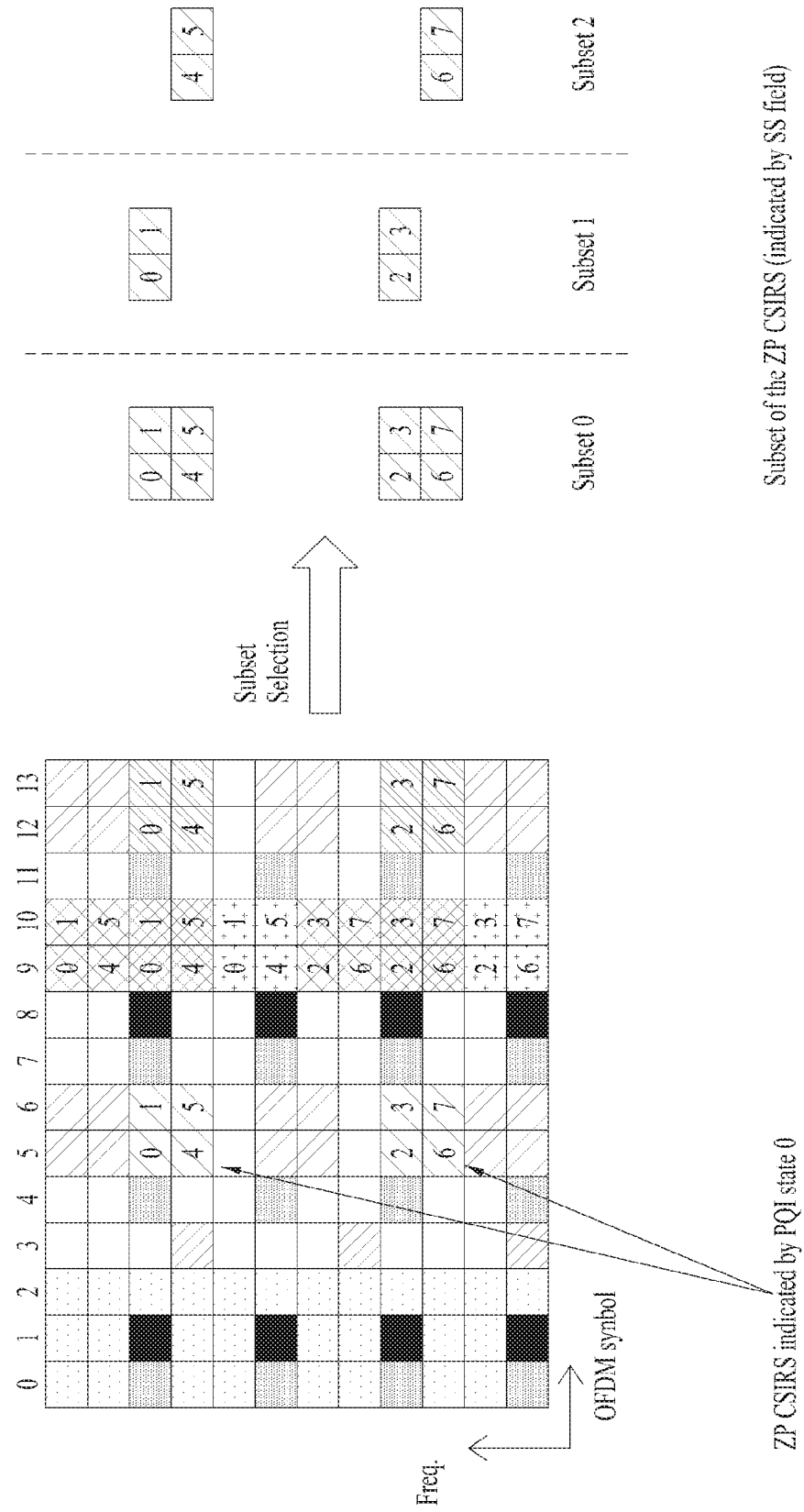
FIG. 9 illustrates an implementation example of a subset selector field according to an embodiment of the present invention.

FIG. 9 illustrates an implementation example of a subset selector field according to an embodiment of the present invention.

Referring to the left diagram in FIG. 9, it may be seen that a ZP CSI-RS for 8 REs is selected through PQI state 0. In this case, a subset for the ZP CSI-RS indicated by PQI state 0 is selected through the SS field according to the embodiment of the present invention, and the UE assumes that data is rate-matched for the subset. It is assumed that data is present in the ZP CSI-RS REs except for the REs of the subset. The eNB may signal, to the UE, how the subset is defined for each value of the SS field through RRC signaling.

Even when the AP CSI-RS is used in the CoMP environment, the above-described SS field may be employed. For example, PQI states 0 to 2 are connected with ZP CSI-RSs defined in TPs 0 to 2, respectively, and the eNB signals a PQI value to be used for RM according to a TP transmitting data. For example, when TP 1 transmits data, PQI state 1 is signaled through DCI. Additionally, to rate-match the AP CSI-RS transmitted by TP 1, the eNB signals a subset for the ZP CSI-RS of TP 1 via the SS field, and the UE performs RM on the subset.

In the future, an advanced eNB is likely to use an AP CSI-RS and a P CSI-RS in combination. For example, the eNB uses the P CSI-RS for the legacy UE and the AP CSI-RS for the advanced (A)-UE. The existing PQI may be connected with a P ZP CSI-RS (i.e., a periodic ZP CSI-RS in which subframe configuration information is present) for periodic IMR or RM of the P CSI-RS, and an AP ZP CSI-RS (i.e., an aperiodic ZP CSI-RS in which no subframe configuration information is present) may be additionally mapped to the PQI for data RM on the AP CSI-RS. That is, the eNB maps the AP ZP CSI-RS other than the P ZP CSI-RS to each PQI state through RRC signaling. In addition, a subset for the AP ZP CSI-RS is designated through the SS field, and the UE uses the PQI and SS fields in the DCI to perform data RM for 1) REs corresponding to the P ZP CSI-RS designated through the PQI and 2) REs corresponding to the subset designated through the SS field in the AP ZP CSI-RS designated through the PQI.

<RM Technique 5>

In order to signal, through the DCI, more diverse ZP CSI-RSs to be used for RM, the PQI states may be extended from 2 bits to 3 or more bits, for example, n bits. However, DCI overhead may be increased. To address the issue, ZP CSI-RS mapping to each PQI state may be changed over time.

For example, one of k ZP CSI-RSs may be mapped to each PQI state, and ZP CSI-RS mapping to each PQI state may be determined according to a result of k modulo operation of a subframe index in which the PDSCH is transmitted. Specifically, when the result of k modulo operation of the subframe index is i (i=0, 1, 2, . . . , or k−1), the i+1-th ZP CSI-RS is mapped among the ZP CSI-RSs defined for each PQI state.

The UE performs data RM using the i+1-th ZP CSI-RS of a PQI state signaled through the DCI. Here, performing data RM using a ZP CSI-RS means that data RM is performed on the assumption that no data is transmitted in the corresponding ZP CSI-RS RE.

When k is 1, this technique is disabled, and the eNB may signal the value of k to the UE. As the value of k increases, the UE comes to have more various RM patterns. As a result, even if various AP CSI-RS RE patterns are generated by the aperiodic AP CSI-RS, the UE is more likely to accurately rate-match the RE patterns.

Alternatively, the eNB may disable or enable the technique for the UE, and k is determined to be either 1 or a specific value greater than 1 according to the result. When the technique is disabled, k is set to 1. When the technique is enabled, k is set to a specific value greater than 1 and RM technique 5 is used.

Figure 10:
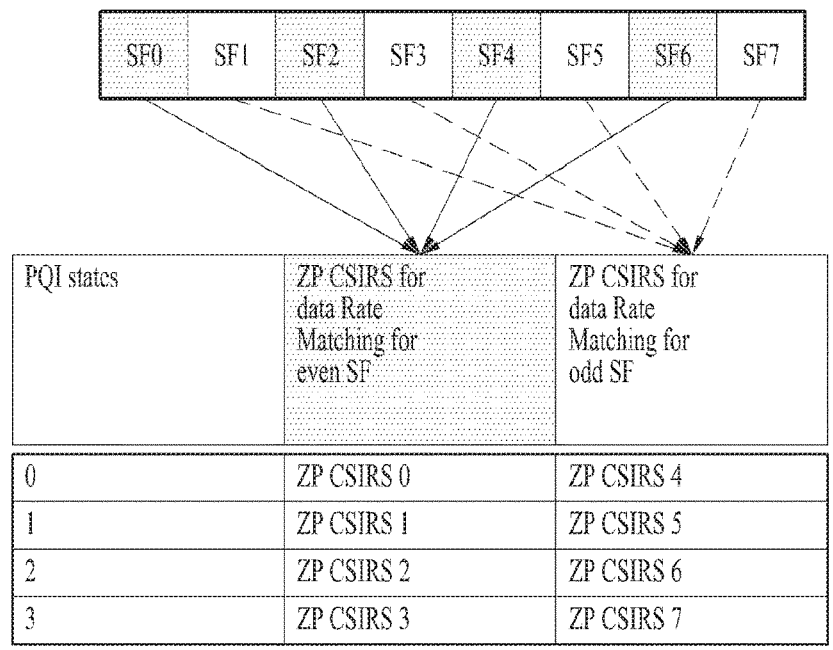
FIG. 10 illustrates an implementation example of changing ZP CSI-RS mapping to each PQI state over time according to an embodiment of the present invention.

FIG. 10 illustrates an implementation example of changing ZP CSI-RS mapping to each PQI state over time according to an embodiment of the present invention.

Referring to FIG. 10, it may be seen that the ZP CSI-RSs connected with each PQI state depend on whether the data is transmitted in an RB assigned an even-numbered index or an RB assigned an odd-numbered index.

As a modification of RM technique 5, mapping between the PQI states and the ZP CSI-RSs may be changed according to change of frequency resources instead of time resources. In addition, mapping between the PQI states and the ZP CSI-RSs may be semi-statically determined through RRC signaling as in the conventional case, but the RE patterns of the ZP CSI-RSs may be configured differently among subframes (i.e., time resources) to perform the same operation.

For example, while it is illustrated in FIG. 10 that one ZP CSI-RS is connected with each PQI state regardless of whether the subframe has an even-numbered index or an odd-numbered index, the RE pattern of the ZP CSI-RS may be configured differently depending on whether the index of the subframe is an even number or an odd number. To this end, the eNB needs to signal, to the UE, "multiple RE patterns used differently for one ZP CSI-RS in each subframe."

In the case of TM 8 and TM 9, which are conventional DM-RS-based PDSCH transmission modes, the PQI field is not contained in the DCI. Therefore, in order to use the RM techniques of the present invention, a PQI field may be added to the DCI corresponding to TMs 8 and 9. In this case, the PQI field may contain only necessary fields related to (ZP CSI-RS) RM by removing a QCL-related field and/or field(s) related to CRS rate matching.

Alternatively, when RM technique 4 is used, the RM method of the present invention may be applied to TMs 8 and 9 by adding only the SS field without adding the PQI field. That is, since one ZP CSI-RS may be semi-statically configured even in TMs 8 and 9 through RRC signaling, a subset is designated by applying the SS field to one ZP CSI-RS configured for the UE, and the UE performs RM on the subset.

Similarly, there is no need to add the PQI field to use RM technique 2. However, a plurality of ZP CSI-RSs are configured for the UE through RRC signaling, and then only one or a part of the ZP CSI-RSs are enabled/disabled through MAC signaling. The UE performs data RM, assuming that there is no data only for ZP CSI-RSs enabled through MAC signaling. Alternatively, in order to use RM technique 3, one ZP CSI-RS may be configured for the UE through RRC signaling without adding the PQI field, and then the RE pattern of the ZP CSI-RS may be indicated through MAC signaling.

Further, in order to use RM technique 5, a plurality of ZP CSI-RSs are configured for the UE through RRC signaling without adding the PQI field, and then data RM is performed using one ZP CSI-RS determined according to the index of a subframe in which data is transmitted.

In the case where RM for the AP CSI-RS is performed through MAC signaling or higher layer signaling without using dynamic signaling such as the PQI as described above, a time window for performing RM is predefined, or the eNB needs to indicate the time window to the UE. For example, a ZP CSI-RS to be used for RM needs to be designated through MAC signaling, and the valid start time and end time of a duration in which RM of the designated ZP CSI-RS is valid needs to be predetermined as fixed values or additionally signaled.

Specifically, when a UE receiving MAC signaling present on the PDSCH of subframe # n transmits ACK in subframe # n+4, the ZP CSI-RS is used for RM from subframe # n+4 to subframe # n+4+20. Here, the value corresponding to the length of the window, 20, may be separately signaled or fixedly defined. Alternatively, the start point and end point of the time window may be specifically signaled.

In addition, signaling for invalidating RM of the ZP CSI-RS may be sent to the UE through MAC signaling. For example, the eNB announces a ZP CSI-RS for RM through MAC signaling in subframe # n and performs RM through the ZP CSI-RS from subframe # n+4, which is the time at which the corresponding ACK is transmitted. Thereafter, the eNB informs, through MAC signaling in subframe # n+100, that the ZP CSI-RS for RM will be invalidated, and the UE does not perform RM through the ZP CSI-RS anymore from subframe # n+104, which is the time at which the corresponding ACK is transmitted.

In recent 3GPP standardization, a multi-shot CSI-RS has been introduced in addition to the above-described AP CSI-RS. In the case of the multi-shot CSI-RS, the UE additionally receives an enable/disable signal for each CSI-RS from the eNB after having received the resource configuration of each CSI-RS from the eNB through RRC signaling. The eNB periodically transmits the enabled CSI-RS until it is disabled. As the enable/disable time of each CSI-RS is set individually, presence or absence of CSI-RS transmission and a CSI-RS transmission RE may be dynamically changed from a cell perspective.

For example, the eNB configures 10 CSI-RSs and enables CSI-RS 0 to CSI-RS 4 in subframe # n. Then, when CSI-RSs 1 to 3 are disabled and CSI-RS 5 is enabled in subframe # n+k, the CSI-RSs transmitted before subframe # n+k differ from the CSI-RSs transmitted after subframe # n+k. As a result, in terms of data RM, RM should be allowed to be performed using different ZP CSI-RSs on a subframe-by-subframe basis as in the case where the AP CSI-RS is introduced. To this end, RM techniques 1 to 4 described above may be extended and applied.

Specifically, when RM technique 1 is used, there are ZP CSI-RSs (and/or subframe configuration information) for data RM for each of various CSI-RS transmission cases, and each of the ZP CSI-RSs is connected with a PQI state through RRC signaling. When there is no subframe configuration information about a ZP CSI-RS corresponding to the signaled PQI, the UE performs RM on the assumption that there is a ZP CSI-RS for the subframe in which the PQI field is received.

Similarly, when RM technique 2 and RM technique 3 are used, there are various ZP CSI-RSs. The ZP CSI-RSs may be dynamically mapped to PQI states. Alternatively, mapping may be semi-statically configured through RRC signaling, and the RE pattern of the ZP CSI-RSs may be dynamically configured through MAC signaling.

Similarly, when RM technique 4 is used, ZP CSI-RSs including CSI-RSs when all the CSI-RSs are enabled may be configured for the UE, and then the eNB may designate a subset of the ZP CSI-RSs through the SS field. The UE performs data RM only for the subset, and assumes that data has been transmitted for the remaining ZP CSI-RS REs.

In the case of the multi-shot CSI-RS described above, the eNB may configure, for the UE, a ZP CSI-RS through which data RM is to be performed, using MAC CE signaling. The eNB configures an RE of the ZP CSI-RS through which the UE is to perform data RM in consideration of the on/off state of the P CSI-RS, and additionally signals a duration in which the RE is used for RM. For example, the eNB may provide additional signaling through the MAC CE such that the ZP CSI-RS is not used for RM anymore, or may set a time by which the ZP CSI-RS is valid for RM. It may be defined that the UE receiving the MAC CE signaling shall perform data RM for the RE of the ZP CSI-RS n points in time after the reception time.

Hereinafter, the relationship between an EPDCCH and an AP CSI-RS that are transmitted in the data region of a subframe will be described.

When the eNB transmits an EPDCCH to UE 1 and transmits an AP (NZP) CSI-RS for UE 1 or another UE in the same cell in subframe # n, a collision occurs between the EPDCCH and the AP CSI-RS. Therefore, in order to eliminate the interference that the EPDCCH applies to the AP CSI-RS, the eNB needs to mute the EPDCCH in the AP CSI-RS RE rather than sending the EPDCCH. This is because the CSI-RS measurement error will become large and the accuracy of CSI-RS-based CSI feedback to be reported later will deteriorate when muting is not performed. UE 1 to receive the EPDCCH may receive the EPDCCH according to Operation 1 or Operation 2 described below.

<Operation 1>

UE 1 receives, from the eNB, the fact that the EPDCCH has been mapped at the position of the AP CSI-RS RE, and assumes that the EPDCCH has been punctured in the EPDCCH-muted RE. That is, in mapping the EPDCCH to REs, the eNB maps the EPDCCH to the REs on the assumption that the EPDCCH is transmitted even at the position of the AP CSI-RS RE. Then, at the actual transmission time, the eNB transmits the AP CSI-RS in the corresponding RE without actually transmitting the mapped EPDCCH. Then, the UE performs decoding of the EPDCCH, assuming the transmission operation described above. As a result, UE 1 assumes that there is noise or dummy data rather than the EPDCCH in the muting RE. In performing the decoding, UE 1 omits the log-likelihood ratio (LLR) calculation or performs the LLR calculation on the assumption of the same probability for data bits 0 and 1 in the muting RE. In order to inform that the EPDCCH has been muted at the position of the AP CSI-RS RE, the eNB indicates the AP ZP CSI-RS resource through the DCI of the PDCCH, not the EPDCCH. The UE then assumes that the EPDCCH has been muted on the indicated AP ZP CSI-RS resource.

<Operation 2>

UE 1 receives, from the eNB, the fact that the EPDCCH has been muted at the positon of the AP CSI-RS RE, and assumes that the EPDCCH is rate-matched in the muting RE. That is, in mapping the EPDCCH to REs, the eNB performs RE mapping and transmits the EPDCCH, assuming that the EPDCCH is not transmitted in the AP CSI-RS RE. The eNB transmits the AP CSI-RS in the AP CSI-RS RE. The UE then performs decoding of the EPDCCH, assuming the operation described above. As a result, UE 1 performs decoding in the muting RE, assuming that the EPDCCH has not been mapped to the muting RE. In order to inform that the EPDCCH has been muted at the position of the AP CSI-RS RE, the eNB indicates the AP ZP CSI-RS resource through the DCI of the PDCCH, not the EPDCCH. The UE then assumes that the EPDCCH has been muted on the indicated AP ZP CSI-RS resource.

The DCI of the PDCCH for Operations 1 and 2 described above may be common DCI transmitted through the common search space (CSS) of the UE. That is, it may be transmitted in the form of DCI of a PDCCH that all UEs may receive in common. Alternatively, the DCI may be provided through UE specific DCI that is transmitted only to a specific UE.

As described above, the AP ZP CSI-RS information is transmitted to the UE through the DCI to allow dynamic RM of the AP CSI-RS. In TM 10, an existing field of the DCI such as the PQI field may be used in the DCI format 2D, or a new field may be added. When such DCI is detected on the PDCCH, the UE performs RM of the PDSCH using the RM information. On the other hand, when such DCI is delivered on the EPDCCH, it may not be used for RM of the EPDCCH.

Specifically, the EPDCCH may be rate-matched at the position of the AP CSI-RS RE, but the aforementioned information is not available because the information is contained in the DCI transmitted on the EPDCCH. That is, the UE needs to know the RM information before decoding the EPDCCH DCI, but the UE can obtain the RM information after decoding the DCI delivered on the EPDCCH.

Accordingly, when DCI is delivered on the EPDCCH, the UE receives DCI having no RM information about the AP CSI-RS. When DCI is delivered on the PDCCH, the UE receives DCI having the RM information about the AP CSI-RS. That is, in terms of the UE operation, the DCI to be monitored is changed depending on whether the DCI is received on the EPDCCH or on the PDCCH.

More specifically, when a P ZP CSI-RS is configured for a conventional UE, the UE performs RM on the P ZP CSI-RS. For example, a UE operating in TM 10 performs RM in a P ZP CSI-RS resource region indicated through the PQI field, and a UE operating in TM 9 or a lower TM performs RM in one ZP CSI-RS resource region configured for the UE.

On the other hand, a UE capable of performing dynamic RM on an AP CSI-RS performs RM on the P ZP CSI-RS and additionally performs RM on an AP ZP CSI-RS delivered through the DCI. That is, the UE of the present invention performs RM on the union of the P ZP CSI-RS resource region indicated by the PQI field and the resource region of the AP ZP CSI-RS. When the PQI field is used to deliver AP ZP CSI-RS information, state 00 of the PQI may be defined as indicating that there is no AP ZP CSI-RS information and RM is performed using the legacy P ZP CSI-RS. Of course, in the remaining PQI states, the legacy P ZP CSI-RS and an AP ZP CSI-RS are indicated together, and the UE performs RM on the union of the two RSs. Similarly, a UE operating in TM 9 performs RM on the union of a P ZP CSI-RS resource region configured for the UE and a resource region of the AP ZP CSI-RS.

A UE of the present invention capable of receiving the AP ZP CSI-RS information may use only the AP ZP CSI-RS for RM without receiving the configuration of the P ZP CSI-RS or without using the configuration for RM when receiving the configuration. When only the AP ZP CSI-RS is used for RM, more AP ZP CSI-RS configurations need to be defined than when the union of the P ZP CSI-RS and the AP ZP CSI-RS is used.

For example, when only the AP ZP CSI-RS is used for RM, it is assumed that four AP ZP CSI-RS configurations corresponding to four ZP CSI-RS RE patterns are required. When the union of the P ZP CSI-RS and the AP ZP CSI-RS is used for RM, eight AP ZP CSI-RS configurations are required to support four ZP CSI-RS RE patterns. This is because four AP ZP CSI-RS configurations in a subframe in which the P CSI-RS is transmitted and four AP ZP CSI-RS configurations in a subframe in which the P CSI-RS is not transmitted are required.

A UE of the present invention operating in TM 9 or a lower TM (i.e., TM 1 to TM 9) performs RM on the union of the resource region of the AP ZP CSI-RS and a P ZP CSI-RS resource region configured for the UE. For example, to perform data RM for the AP CSI-RS, a new field may be additionally defined in the DCI of TM 9 or a lower TM. For example, when a 2-bit field is additionally defined, one state of the added field is defined to perform RM of a subframe without the AP CSI-RS, and the remaining states of the added field are defined to perform RM of a subframe having the AP CSI-RS.

For example, in state 00, the AP ZP CSI-RS is not additionally defined. When state 00 is indicated to the UE, the UE performs RM using the existing P ZP CSI-RS. The AP ZP CSI-RS is defined in each of state 01 to state 11, and a UE receiving an indication of one of these states performs RM using the union of the P ZP CSI-RS and an AP ZP CSI-RS defined by the indicated state.

Similarly, when the AP ZP CSI-RS is indicated, the UE may be operated to use only the AP ZP CSI-RS without using the P ZP CSI-RS. In this case, the P ZP CSI-RS indication needs to be replaced by an indication of the AP ZP CSI-RS in the PQI field of the TM 10 DCI. That is, in each PQI state, the P ZP CSI-RS and the AP ZP CSI-RS cannot be indicated together and only one of the RSs may be indicated. The UE performs RM using only the indicated P ZP CSI-RS or AP ZP CSI-RS. When a state in which the AP ZP CSI-RS is not defined is indicated in a new field added to the DCI of TM 9 or a lower TM, RM is performed using only the P ZP CSI-RS. On the other hand, when a state in which the AP ZP CSI-RS is defined is indicated, RM is performed using only the AP ZP CSI-RS, ignoring the P ZP CSI-RS.

Indication of an AP ZP CSI-RS for performing RM on data or an EPDCCH RE may be performed by adding some fields to the legacy DCI or by introducing new common DCI. This common DCI may be DCI that is transmitted through a PDCCH common search space (CSS), and may be received by multiple UEs in common. The common DCI is composed of a bit field for indication of an AP ZP CSI-RS for RM. In a single component carrier or a single-cell environment, common DCI such as DCI format 1A and/or DCI format 1C masked with a new RNTI is composed of an N-bit field, and UEs in the carrier or cell perform blind detection (BD) on the common DCI having the size of N bits. An AP ZP CSI-RS to be used for RM is defined in each state defined by the N-bit field. Specifically, an AP ZP CSI-RS ID corresponding to each state is predefined through RRC signaling, and the AP ZP CSI-RS corresponding to the AP ZP CSI-RS ID is preconfigured for the UE through RRC signaling. N may be announced to the UE by the eNB through RRC signaling or may be implicitly determined by a value of a function such as Ceiling [log (the number of AP ZP CSI-RSs configured for the UE through RRC signaling)] (where Ceiling denotes rounding-up).

In a CA environment where K carriers or cells are used, the common DCI may be composed of a $N_1+N_2+ \ldots +N_K$-bit field, and the UEs present in the carriers or cells perform BD on the $N_1+N_2+ \ldots +N_K$-bit common DCI. In the $N_1+N_2+ \ldots +N_K$-bit common DCI, the bits corresponding to $N_i$ indicate an AP ZP CSI-RS used for RM on the i-th carrier (or cell). That is, each state indicated by the $N_i$ bits indicates an AP ZP CSI-RS to be used for RM on the i-th carrier. The UE may use (or receive configurations of)

some or all of carrier #1 to carrier # K, and each UE may use a different carrier. For example, UE 1 and UE 2 may use carrier #1 and carrier #2, respectively.

Since different carriers (or cells) may be used for the respective UEs, each UE obtains the AP ZP CSI-RS information by taking only bits corresponding to a carrier that the UE uses in the $N_1+N_2+\ldots+N_K$-bit field, and ignores the remaining payload. For example, when the UE uses carrier #1 and carrier #3, the UE obtains RM information to be used on carrier #1 and carrier #3 by taking only bits corresponding to $N_1$ and $N_3$.

In order to decode the common DCI, the UE needs to know $N_1+N_2+\ldots+N_K$, which is the payload size of the entirety of the common DCI. To this end, the eNB needs to signal $N_1, N_2, \ldots, N_K$ (or $N_1+N_2+\ldots+N_K$), which is the total payload size. In addition, the UE needs to receive, from the eNB, information about the bits to be used by the UE in the $N_1+N_2+\ldots+N_K$-bit field. For example, when the UE uses carrier #1 and carrier #3, the eNB indicates that only bits corresponding to $N_1$ and $N_3$ are meaningful among the $N_1+N_2+\ldots+N_K$ bits and the remaining bits are unnecessary information. The bits may be set such that the condition of $N_1=N_2=\ldots=N_K$ is always satisfied. Alternatively, the bits may be fixed to $N_1=N_2=\ldots=N_K=$a specific constant c. In this case, the eNB may inform the UE of K and the UE may recognize the payload size of the common DCI as c×K bits.

Although the present invention focuses on data RM for the ZP CSI-RS, the UE needs to additionally perform RM for the NZP CSI-RS. RM for the NZP CSI-RS is the same as the existing UE operation.

FIG. 11 is a block diagram of a communication apparatus according to an embodiment of the present invention.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method for data channel RM according to an aperiodic CSI-RS in a wireless communication system and a device therefor have been described with reference to examples applied to the 3GPP LTE system. The method and the device are applicable to various wireless communication systems other than the 3GPP LTE system.

What is claimed is:

1. A method for receiving, by a user equipment (UE), a UE-specific control channel from a base station in a wireless communication system, the method comprising:
    receiving resource configuration information for at least one aperiodic Channel Status Information-Reference Signal (CSI-RS) through a higher layer;
    receiving resource configuration information for at least one periodic CSI-RS through the higher layer;

receiving a common control channel including rate matching information about the UE-specific control channel; and receiving, from the base station, the UE-specific control channel including a triggering message of CSI reporting based on the at least one aperiodic CSI-RS along with the at least one aperiodic CSI-RS using the rate matching information, on an assumption that the UE-specific control channel is not mapped to an union of resources for the at least one aperiodic CSI-RS and resources for the at least one periodic CSI-RS.

2. The method according to claim 1, wherein the receiving of the UE-specific control channel comprises:
receiving the UE-specific control channel on an assumption that the UE-specific control channel is not mapped to resources for the at least one aperiodic CSI-RS.

3. The method according to claim 1, further comprising:
receiving a data channel scheduled by the UE-specific control channel,
wherein the UE-specific control channel comprises rate matching information about the data channel.

4. The method according to claim 1, wherein the rate matching information about the UE-specific control channel comprises information indicating a subset of resources for the at least one aperiodic CSI-RS,
wherein the receiving of the UE-specific control channel comprises:
receiving the UE-specific control channel on an assumption that the UE-specific control channel is not mapped to the subset of resources for the at least one aperiodic CSI-RS.

5. A user equipment (UE) in a wireless communication system, comprising:
a wireless communication module; and
a processor connected to the wireless communication module,
wherein the processor is configured to:
receive resource configuration information for at least one aperiodic Channel Status Information-Reference Signal (C SI-RS) through a higher layer,
receive resource configuration information for at least one periodic CSI-RS through the higher layer,
receive a common control channel including rate matching information about a UE-specific control channel, and
receive, from a base station, the UE-specific control channel including a triggering message of CSI reporting based on the at least one aperiodic CSI-RS along with the at least one aperiodic CSI-RS using the rate matching information, on an assumption that the UE-specific control channel is not mapped to an union of resources for the at least one aperiodic CSI-RS and resources for the at least one periodic CSI-RS.

6. The UE according to claim 5, wherein the processor is configured to:
receive the UE-specific control channel on an assumption that the UE-specific control channel is not mapped to resources for the at least one aperiodic CSI-RS.

7. The UE according to claim 5, wherein the processor is configured to:
receive a data channel scheduled by the UE-specific control channel,
wherein the UE-specific control channel comprises rate matching information about the data channel.

8. The UE according to claim 5, wherein the rate matching information about the UE-specific control channel comprises information indicating a subset of resources for the at least one aperiodic CSI-RS,
wherein the processor is configured to:
receive the UE-specific control channel on an assumption that the UE-specific control channel is not mapped to the subset of resources for the at least one aperiodic CSI-RS.

* * * * *